United States Patent [19]

Wessner et al.

[11] Patent Number: 5,047,651
[45] Date of Patent: Sep. 10, 1991

[54] ARRANGEMENT FOR MEASURING A DEVIATION FROM ITS LINE OF A MOVABLE WEB OF FOIL

[75] Inventors: Michael Wessner, Baar; Daniel Holliger, Steinhausen, both of Switzerland

[73] Assignee: Landis & Gyr Betriebs AG, Zug, Switzerland

[21] Appl. No.: 499,949

[22] Filed: Mar. 27, 1990

[30] Foreign Application Priority Data

Apr. 12, 1989 [CH] Switzerland ............... 1381/89

[51] Int. Cl.$^5$ ............................................. G01N 21/86
[52] U.S. Cl. ....................................... 250/548; 356/401
[58] Field of Search ................. 250/548, 202, 557; 356/400, 401

[56] References Cited

U.S. PATENT DOCUMENTS

| | | | |
|---|---|---|---|
| 3,697,761 | 10/1972 | Kamachi | 250/202 |
| 3,957,378 | 5/1976 | Zipin | 356/374 |
| 4,587,414 | 5/1986 | Bohlander | 250/548 |
| 4,682,038 | 7/1987 | Focke | 250/548 |
| 4,695,720 | 9/1987 | Rieder et al. | 356/401 |
| 4,731,542 | 3/1988 | Doggett | 250/548 |

FOREIGN PATENT DOCUMENTS 1207640 12/1965 Fed. Rep. of Germany .
2106642 4/1983 United Kingdom .
2186362 8/1987 United Kingdom .

OTHER PUBLICATIONS

Patent Abstract of Japan, vol. 9, No. 300 (M-433) [2032] Nov. 27, 1985 including No. 60,137,752.

Primary Examiner—David C. Nelms
Assistant Examiner—Khaled Shami
Attorney, Agent, or Firm—Marmorek, Guttman & Rubenstein

[57] ABSTRACT

The arrangement comprises a tracking sensor with a light source, an optical means and a receiver with two photosensitive detectors, as well as a measuring apparatus with a computing unit. The optical means focuses light to provide a beam which falls on a moving web of foil. The tracking sensor may, for example, be installed in a re-winding installation, and during re-winding of the web, senses by means of the beam a marking track which is embossed in the web in the longitudinal direction of the web and which is composed of two different diffraction grating tracks. Each diffraction grating track projects the light diffracted therefrom in a predetermined direction of incidence to a respective detector. The sensed signals supplied by the receiver are converted into a difference signal by the measuring apparatus, and processed to provide correction signals which are supplied to a control means of the re-winding installation in order to compensate for lateral deviation of the moving web of foil.

12 Claims, 3 Drawing Sheets 5,047,651

ARRANGEMENT FOR MEASURING A DEVIATION FROM ITS LINE OF A MOVABLE WEB OF FOIL

BACKGROUND OF THE INVENTION

1. Field of the Invention

This invention relates to an arrangement for measuring a deviation from its line of a movable web of foil.

Such measuring arrangements are advantageously used for cutting an embossed web of plastics foil on re-winding cutting machines, in order to sense precisely the lateral position of the web of foil.

2. Description of the Prior Art

Optical line-of-movement or tracking sensors are known which, during unwinding and re-winding of a web of foil, continuously measure the lateral deviation of the web from a prescribed central position by means of optical sensing of an edge of the web. The tracking sensor comprises a light source with an optical system acting as a transmitter on one side of the web of foil, and a detector acting as a receiver on the other side. It determines the position of the edge of the web, which masks a light beam from the transmitter to a greater or lesser degree. The tracking sensor transmits sensed signals to a measuring device which produces a control signal for correcting the deviation, the control signal being supplied to guide rollers. The web of foil is returned to its central position by means of the guide rollers. A disadvantage with this arrangement is the sensitivity of the tracking sensor to flaws in the edge of the web of foil and to the transparency of the foil.

On the other hand, tracking sensors are known which follow a marking track produced by graphic means on the web of foil. These optical tracking sensors comprise a lighting device acting as the transmitter and a receiver for reflected light, which is arranged on the same side of the web. They detect the marking track by virtue of differences in reflectivity. Such tracking sensors are sensitive to variations in the intensity of the lighting and to alterations in the reflectivity of the web of foil and the marking track.

SUMMARY OF THE INVENTION

An object of this invention is to provide an arrangement for measuring a deviation from its line of a movable web of foil, which has an increased level of measuring accuracy using simple means and which is independent of fluctuations in the intensity of the lighting.

In accordance with the invention there is provided an arrangement for measuring the deviation of a marking track of a web of foil from a central position, the arrangement comprising: a tracking sensor including a light source and an optical receiver, the light source having an optical means for illuminating the marking track with a spot of predetermined size, the optical receiver having two photosensitive detectors for producing respective sensed signals in response to light received from the illuminated spot, and wherein the tracking sensor and the web of foil are movable relative to each other; and a measuring apparatus connected to the photosensitive detectors and including a computing unit for converting the sensed signals from the photosensitive detectors into a difference signal indicative of the deviation of the marking track; wherein the marking track comprises two mutually parallel diffraction grating tracks differing in diffraction-optical characteristics, and wherein each of the photosensitive detectors is arranged so as to receive light diffracted at a predetermined order of diffraction from a respective one of the two diffraction grating tracks when the illuminated spot is coincident with the respective diffraction grating track.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
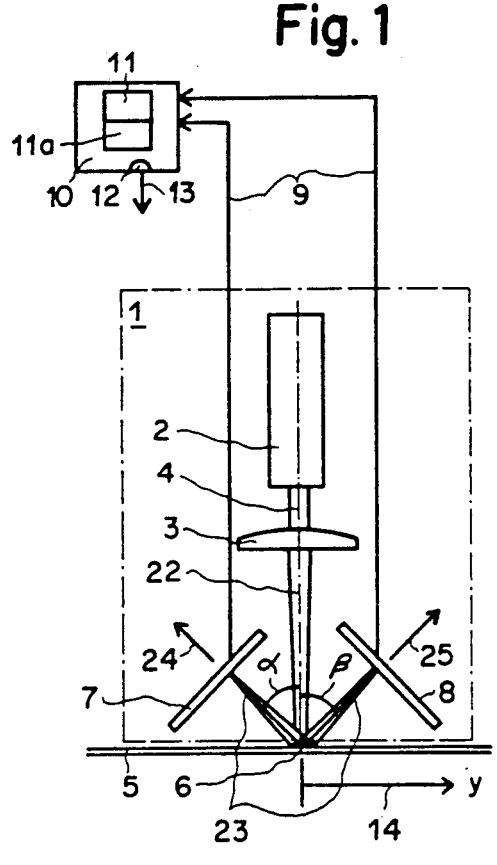
FIG. 1 is a view in section through a tracking sensor.

In FIG. 1, a line-of-movement or tracking sensor 1 comprises a light source 2, an optical means 3 and a photosensitive receiver. The optical means 3 focuses the light 4 produced by the light source 2 on a web 5 of foil at a spot 6. Two detectors 7 and 8 of the receiver are connected by way of lines 9 to a measuring device 10 which has a computing unit 11 with a storage means 11a and which outputs a correction signal 13 at an output 12.

For the purposes of carrying out a sequential operation, the web 5 is unwound from one roller and re-wound on to another on a re-winding installation (not illustrated herein). Such a sequential operation is, for example, a cutting operation for dividing the web 5 lengthwise into narrow strips. The web 5 of foil is guided by way of guide rollers (not illustrated herein), in the re-winding operation. Mechanical stresses in the web 5, minor variations in the structure of the re-winding installation and the like cause the unwinding web 5 of material to move laterally out of an ideal central position, resulting in a deviation y in a lateral direction as indicated at 14. That displacement of the web 5 causes problems for the sequential operation and is one cause of reject articles being produced. The displacement is effectively reduced by a web regulating assembly described hereinafter, with a measuring arrangement comprising the tracking sensor 1 and the measuring device 10.

Figure 2:
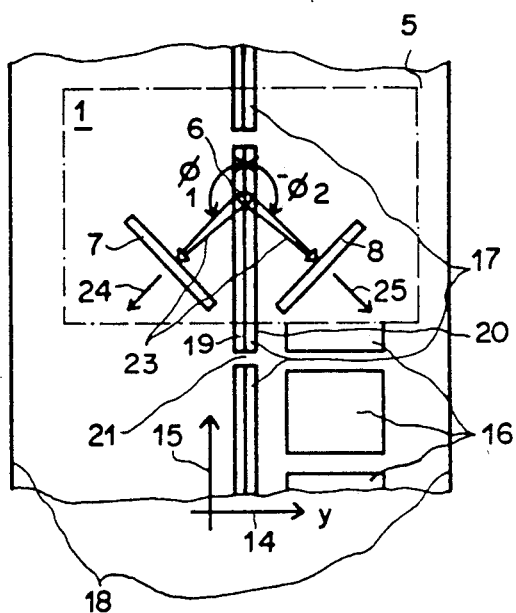
FIG. 2 is a plan view of the sensor shown in FIG. 1.

In FIG. 1, the web 5 of foil is drawn perpendicularly into the plane of the drawing in the re-winding operation. The tracking sensor 1 is installed in the re-winding installation and senses the surface of the web 5, which faces towards the sensor 1, by means of light as indicated at 4. The lateral direction 14 is in the plane of the web 5 of foil and is perpendicular to a direction 15 of the web (see FIG. 2), which direction 15 gives the direction of movement of the web 5 when it is being unwound and re-wound.

The tracking sensor 1 analyzes the light reflected from the web 5 of foil which may comprise, for example, a thin plastics foil with embossed patterns 16, and in the measuring device 10 (see FIG. 1) produces the correction signals 13 which are dependent on the deviation y. A control device (not shown herein) of the re-winding installation, which control device is connected to the output 12, evaluates the correction signals 13 and by means of adjustable guide rollers regulates the position of the web 5 of foil which moves relative to the sensor 1, in such a way that the web 5 is in the central position.

In another construction the tracking sensor 1, together with means (not shown) used in the sequential operation, is displaced relative to the web 5 of foil which is guided in a fixed position.

To provide for precise lateral guidance, the web 5 of foil (see FIG. 2) has at least one marking track 17 which is applied simultaneously with the patterns 16. The patterns 16 are either provided continuously over the entire length of the web 5 or they are periodically repeated, as is predetermined by the embossing operation. The narrow marking track 17 which is embossed on to the web 5 is at a predetermined spacing in the lateral direction 14, relative to the patterns 16. The marking track 17 extends with its longitudinal direction continuously or in short sections between the two edges 18 of the web 5 of material. If the patterns 16 are produced in a plurality of working operations, then the marking track 17 is advantageously produced in the first working operation so that the web 5 is aligned by means of the marking track 17 in each of the consequential operations The discontinuous marking track 17 which is divided up into short sections is made up in each section from a first rectangular diffraction grating track 19 and a second rectangular diffraction grating track 20, which are closely adjacent and which touch for example along a common longitudinal side. A diffraction grating with a respective predetermined relief profile is embossed in each diffraction grating track 19 and 20. A small intermediate space 21 without embossing is to be found between the successive sections of the marking track 17. The length of the space 21 is preferably less than the length of a section.

The continuous marking track 17 is only a special case of a discontinuous track since it then consists of a single section of corresponding length.

In the first diffraction grating track 19, the diffraction grating has a first azimuth angle $\Phi_1$, while in the second diffraction grating track 20, the diffraction grating has a second azimuth angle $\Phi_2$, the azimuth angles $\Phi_1$ and $\Phi_2$ being measured in relation to the web direction 15. The grating frequency of each diffraction grating determines a respective diffraction angle $\alpha$ and $\beta$ respectively (see FIGS. 1 and 2), which is measured between a beam produced from the light 4 by the optical means 3, and light 23 which is diffracted at the diffraction grating at a predetermined order. The direction of the light 23 which is diffracted at the first diffraction grating is of azimuth angles $\Phi_1$ and $180+\Phi_1$ and the diffraction angle $\alpha$. At the second diffraction grating, the light 4 which impinges on the marking track 17 at the spot 6 is diffracted at the second pair of azimuth angles $\Phi_2$ and $180+\Phi_2$, and the diffraction angle $\beta$.

The two diffraction gratings advantageously differ only in respect of their respective azimuth angles $\Phi_1$ and $\Phi_2$. For example, the two diffraction gratings may have the same symmetrical relief profile with the same grating frequency, which preferably diffract the light 4 into the first order. The two diffraction angles $\alpha$ and $\beta$ are therefore of equal magnitude. The advantage of such diffraction gratings lies in the inexpensive production of an embossing matrix for the marking track 17.

The area around the marking track 17 preferably has a matte surface with a diffuse scatter effect.

The light source 2 and the detectors 7 and 8 of the receiver are arranged above the web 5 on the same side. The light source 2 is disposed above the web 5 and has the optical means 3 between the light source 2 and the web 5. The sensing operation is preferably carried out using monochromatic light 4 which is matched to the detectors 7 and 8, in order to increase the level of selectivity of the tracking sensor 1, relative to extraneous light.

Each detector 7 and 8 is disposed in the receiver at a respective incidence direction 24 and 25 which is predetermined by the diffraction gratings of the marking track 17. Arranged in front of the photosensitive surface of each detector 7 and 8 is a collimator (not shown herein) or another optical device which advantageously reduces the sensitivity to extraneous light of the respective detectors 7 and 8.

The light source 2, the optical means 3 and the receiver are disposed, for example, in a housing which keeps extraneous light away from the receiver and which thus additionally enhances the sensitivity of the detectors 7 and 8 and also protects the tracking sensor 1 from fouling.

The optical means 3, for example a lens arrangement, forms the light 4 into a beam 22 which impinges perpendicularly on to the plane of the web 5 at the spot 6. Advantageously, an aperture (not shown) in the optical means 3 may restrict the spot 6 to a predetermined surface shape of predetermined size. The spot 6 is homogeneously illuminated and is, for example, in the form of a circle or a rectangle. The light 23, which is diffracted at the diffraction gratings of the marking track 17, impinges on the detectors 7 and 8 when it is diffracted in the respective incidence directions 24 and 25.

The two detectors 7 and 8 which are arranged symmetrically with respect to the beam 22 are advantageously disposed at the same predetermined spacing relative to the web 5 of foil.

For example, the value of the azimuth angle $\Phi_1$ is 135° while that of the angle $\Phi_2$ equals 225°. The first-order diffraction angle $\beta$ is in the range between 30° and 60°. With those angles which determine the directions 24 and 25 respectively, the structure of the tracking sensor 1 is very simple and the sensitivity of the detectors 7 and 8 to other light than that which is diffracted at the predetermined diffraction grating is minimal.

Optical fiber light guides for the optical means 3 and for the collimators of the detectors 7 and 8 advantageously reduce the amount of space occupied by the tracking sensor 1. One optical fiber light guide is arranged to guide the light 4 from the light source 2 to a position a few millimeters above the spot 6, and the others collect the diffracted light 23 in the directions 24 and 25 approximately at the same spacing and pass it to the corresponding detectors 7 and 8. If the light guides are flexible, the tracking sensor 1 can be divided into a reading head and a transducer portion which can be mounted independently of each other but connected by means of the light guides. Only one end of each of the light guides for sensing of the marking track 17 is fixedly arranged in the reading head. The transducer portion includes the light source 2, the optical means 3 and the detectors 7 and 8 to which the other ends of the light guides are connected, and is disposed, for example, in the housing of the measuring device 10.

The measuring device 10 can be of a digital type or can be constructed with means from the analog art.

Figure 3:
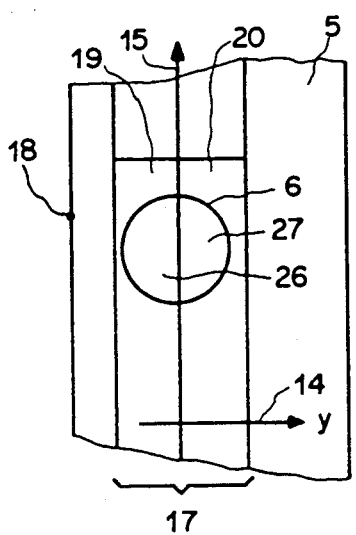
FIG. 3 shows an enlarged portion from FIG. 2 with a marking track.

In the spot 6, as shown in FIG. 3, the beam 22 lights a first surface portion 26 of the diffraction grating in the first diffraction grating track 19 and a second surface portion 27 in the second diffraction grating track 20. If, during the web re-winding operation, the web 5 with the marking track 17 moves in the direction 15 of the web, then the spot 6 is moved on the marking track 17 in opposition to the direction 15, in which case fresh surface portions 26 and 27 are always illuminated.

If during the re-winding operation the web 5 experiences a lateral deviation, then the relationship between the surface portions 26 and 27 which are illuminated in the spot 6 changes. If, for example, the web 5 is displaced in the direction indicated at 14, that is to say the deviation y is positive, then the spot 6 is displaced in such a way that the first surface portion 26 is increased in size, at the expense of the second surface portion 27. With negative deviations y, the second surface portion 27 increases in size, at the expense of the first surface portion 26. In the event of major fluctuations y or −y, the spot 6 lights up only one surface portion 26 or 27 of the respective diffraction grating tracks 19 and 20. In the ideal central position of the web 5, the two surface portions 26 and 27 are equal in size.

The levels of intensity of the diffracted light 23 (see FIG. 1) in the directions 24 and 25 vary in proportion to the surface portions 26 and 27 if the diffraction gratings have the same level of efficiency.

Figure 4:
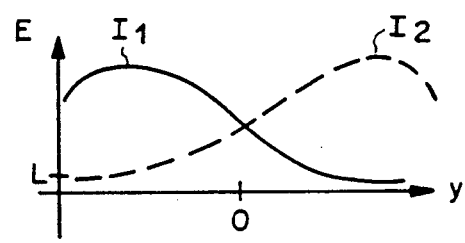
FIG. 4 shows sensed signals from the tracking sensor as a function of a deviation y.

The detector 7 proportionally converts the light 23 which is diffracted in the first direction 24, and the detector 8 proportionally converts the light which is diffracted in the second direction 25, into electrical received or sensed signals E (see FIG. 4) which are of an intensity $I_1$ and $I_2$ respectively. For negative deviations y, $I_2 > I_1$; in the central position which is here illustrated with y=0, $I_1$ and $I_2$ are of equal value; while, for positive deviations y, $I_1 > I_2$.

The received signals E of each detector 7 and 8 (FIGS. 1 and 4) are amplified in separate amplifiers in the measuring device 10. The gain factor is adjustable in at least one of the amplifiers. This provides the advantage that the different levels of efficiency of the diffraction gratings and the detectors 7 and 8 are balanced out and the central position of the web 5 is adjustable.

Figure 5:
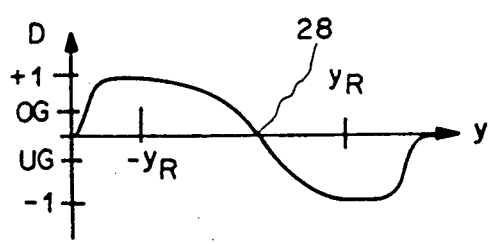
FIG. 5 shows a difference signal formed from the signals in FIG. 4, as a function of the deviation y.

The computing unit 11 of the measuring device 10 processes the received signals E and forms a difference signal $D = I_2 - I_1$ (see FIGS. 1, 4 and 5) which is therefore substantially dependent on the intensity of illumination of the spot 6 and the level of efficiency of the diffraction gratings. The tracking sensor 1 is therefore only sensitive to the diffracted light 23.

The difference signal D undergoes a transition 28 through zero in the event of a deviation y=0. When y<0, the difference signal D>0 while when y>0, D<0. The measuring device 10 (see FIGS. 1, 3 and 5) recognizes from the sign of D in which direction 14 the spot 6 is to be displaced in order to reduce the extent of the deviation y.

The difference signal D is advantageously normalized:

$$D = \frac{I_2 - I_1}{I_2 + I_1} \qquad \text{(formula 1)}$$

The normalized difference signal D is therefore of a value of 1 if, in the event of a deviation $y_R$ or $-y_R$, the surface portion 26 or 27 respectively disappears and the spot 6 only illuminates a single diffraction grating. If the spot 6 moves further out of the marking track 17, the surface portion 26 or 27 of the single diffraction grating which is illuminated in the spot 6 is reduced in size and the intensity of the diffracted light 23 decreases to the intensity of the ambient light. The magnitude of the difference signal D is also reduced and reaches a value of zero as soon as the spot 6 occurs outside the marking track 17 on the web 5, in the event of a maximum deviation +y or −y respectively. Each maximum deviation y is the sum of the dimension of the spot 6 transversely with respect to the marking track 17 and the width of the diffraction grating tracks 19 and 20 respectively.

The maximum values in respect of the deviation y or −y together determine a capture region for the measuring arrangement or control of the re-winding installation while a utilizable regulating range of the measuring arrangement is delimited by the deviation values $-y_R$ and $y_R$.

The transition 28 through zero of the difference signal D determines the lateral position of the web 5 and is displaceable in the direction 14 by varying the gain factors of the amplifiers in the measuring device 10; this permits precise alignment of the re-winding installation in the lateral direction 14.

The difference signal D is advantageously compared in the computing unit 11 to an upper limit value OG and a lower limit value UG. As long as the difference signal D is between the two limit values OG and UG, no correction signal 13 appears at the output 12. If the difference signal D exceeds the upper limit value OG or if it is below the lower limit value UG, correction signals 13 are passed from the output 12 to the control device of the re-winding installation. The correction signals 13 serve as instructions to the control device for controlling the re-winding installation and cause the web 5 to be displaced relative to the beam 22 in the lateral direction 14 in order to bring the web 5 back into the central position.

The two limit values OG and UG are called up from the storage means 11a. They determine the tolerance in respect of the control action and when the re-winding installation is set up those values are set in known fashion to predetermined values in the storage means 11a and are stored therein.

The way in which the correction signals 13 are transmitted depends on the downstream-disposed control device of the re-winding installation and is within the area of knowledge of the man skilled in the art. For example, in the situation where D>OG, the correction signal 13 is of positive polarity while in the situation where D<UG, the correction signal is of negative polarity. It is also possible to provide two channels at the output 12, in which case the correction signal 13 appears at one of the two channels, depending on whether D>OG or D<UG.

In another design configuration, the amplified difference signal D is passed directly to the control device, with control constantly being effected by reference to the central position.

The intensity of the light 23 which is diffracted at the diffraction gratings of the marking track 17 (FIGS. 1 and 2) is a multiple of the intensity of the light 4 which is scattered at the unembossed web 5 or at the matte surface thereof. The tracking sensor 1 therefore preferably receives only the diffracted light 23 to which it is sensitive. That is advantageous in processing or treating foils since the tracking sensor 1 correctly analyzes the light 23 which is diffracted at the marking track 17, even if the web 5 of foil is transparent in relation to the light 4, is colored or is, for example, covered with a reflective layer.

The capture range and the regulating range of the measuring arrangement are advantageously disposed symmetrically with respect to the ideal central position. The two diffraction grating tracks 19 and 20 are of the same width and the marking track 17 is at least as wide as the dimension of the spot 6. The spot 6 may advantageously be in the form of a rectangle, the long side of which corresponds to the width of the marking track 17 as the configuration of the difference signal D is linear over the entire regulating range. For a deviation y=0, the notional point of intersection of the two diagonals of that rectangle lies precisely on the common longitudinal side of the two diffraction grating tracks 19 and 20.

The length of the sections and the size of the unembossed intermediate space 21 along the marking track 17 are predetermined by the embossing die and the embossing process, the length of a section amounting to both a multiple of the width of the marking track 17 and also a multiple of the intermediate space 21. All sections are advantageously of the same length so that the marking track 17 can be inexpensively produced with a single embossing die.

In one configuration of the marking track 17, the width thereof is for example 3.6 mm, while each of the two diffraction grating tracks 19 and 20 is of the same width. Each section of the marking track 17 has a length of 26 mm with an intermediate space 21 of 2.9 mm.

The regulating range of the measuring arrangement, which can be utilised in the lateral direction 14, is thus ±1.8 mm, when using the above-described rectangular spot 6, and with a circular spot 6 of 1.4 mm diameter, it is ±1.3 mm.

The re-winding installation pulls the web 5 of foil through relative to the tracking sensor 1 at speeds of more than 1 m/s and regulates the position of the web 5 of foil, which is for example 600 mm in width, accurately to fractions of a millimeter in relation to the marking track 17. With webs 5 of foil of such a width, the marking track 17 is advantageously arranged in the middle so that error due to shrinkage of the foil, which is possible in the processing or treatment procedure, is halved. For example, that error is 0.6 mm in the event of shrinkage of the web of foil by 1% when the width thereof is 600 mm as measured between the two edges 18.

When dealing with very wide webs 5 of foil, it is advantageous to provide a plurality of parallel marking tracks 17, in which case, for example, one of the marking tracks 17 serves to control the position of the web 5 and the other marking tracks 17, by means of separate measuring arrangements, precisely control the means (not shown) of a sequential operation, in accordance with the patterns 16. After the web 5 of foil has been subdivided into narrower strip portions, the other marking tracks 17 permit precise post-treatment of the strip portions.

In another embodiment of the tracking sensor 1, the light source 2 and the optical means 3 are arranged on the unembossed side of the transparent web 5 of foil and the receiver is arranged on the embossed side. The beam 22 passes through the web 5 of foil and is only diffracted at the diffraction gratings of the marking track 17 when it emerges from the web 5 of foil. The diffracted light 23 then falls on the detectors 7 and 8.

The sensitivity to ambient light of the receiver is advantageously reduced by using modulated light 4. For example, the light source 2 or the optical means 3 modulates the intensity of the light 4 in the beam 22. Besides unmodulated ambient light components, the sensed signals E include a modulation signal which is produced by the modulated diffracted light 23. The amplifiers for the sensed signals E selectively amplify the modulation signal, with the extraneous ambient light components in the sensed signals E being suppressed.

In an advantageous embodiment, the computing unit 11 of the measuring apparatus 10 (see FIG. 1) produces auxiliary signals, for example an additional signal and a tracking signal, as soon as the beam 22 does not illuminate one of the diffraction grating tracks 19 and 20, that is to say the beam 22 has left the marking track 17. In that situation, loss of the two sensed signals E occurs or the intensities $I_1$ and $I_2$ of the two sensed signals E fall to the values for scattered light 4. The fact that the marking track 17 has been left is advantageously established by the sum made up of the signal intensities $I_1$ and $I_2$ of the two sensed signals E falling below a level L which can be adjusted in a predetermined fashion. The level L is above the sum made up of the signal intensities $I_1$ and $I_2$ of the two sensed signals E for scattered light 4. The auxiliary signals are displayed on a display panel (not shown herein) of the measuring apparatus 10.

If the measuring arrangement is in the regulating range when it registers the loss of the two sensed signals E, the additional signal is outputted. That condition is met if the beam 22 falls on the intermediate space 21 between successive sections of the marking track 17.

The tracking signal is produced if the loss of the two sensed signals E has occurred on leaving the capture range. Since, on leaving the capture range, the sign of the difference signal D does not change, the measuring arrangement advantageously also indicates the lateral direction 14 of the deviation y.

In order to facilitate setting up the re-winding installation, the display panel of the measuring apparatus 10 advantageously has an optical display of the difference signal D. In the regulating range of the measuring arrangement, for example, it directly displays the deviation y in units of length (for example μm) while in the capture range it displays the lateral direction 14 or the sign of the deviation y. The two auxiliary signals indicate, for example, by means of display lamps the loss of the sensed signals E and the direction in which the spot 6 has moved away from the marking track 17.

The additional signal is advantageously transmitted to the control means of the re-winding installation, and blocks the control action until the spot 6 has moved over an intermediate space 21 in the marking track 17 and until the spot 6 again illuminates the next section of the marking track 17. A further use is signalling the beginning of a fresh period of the patterns 16.

Figure 6:
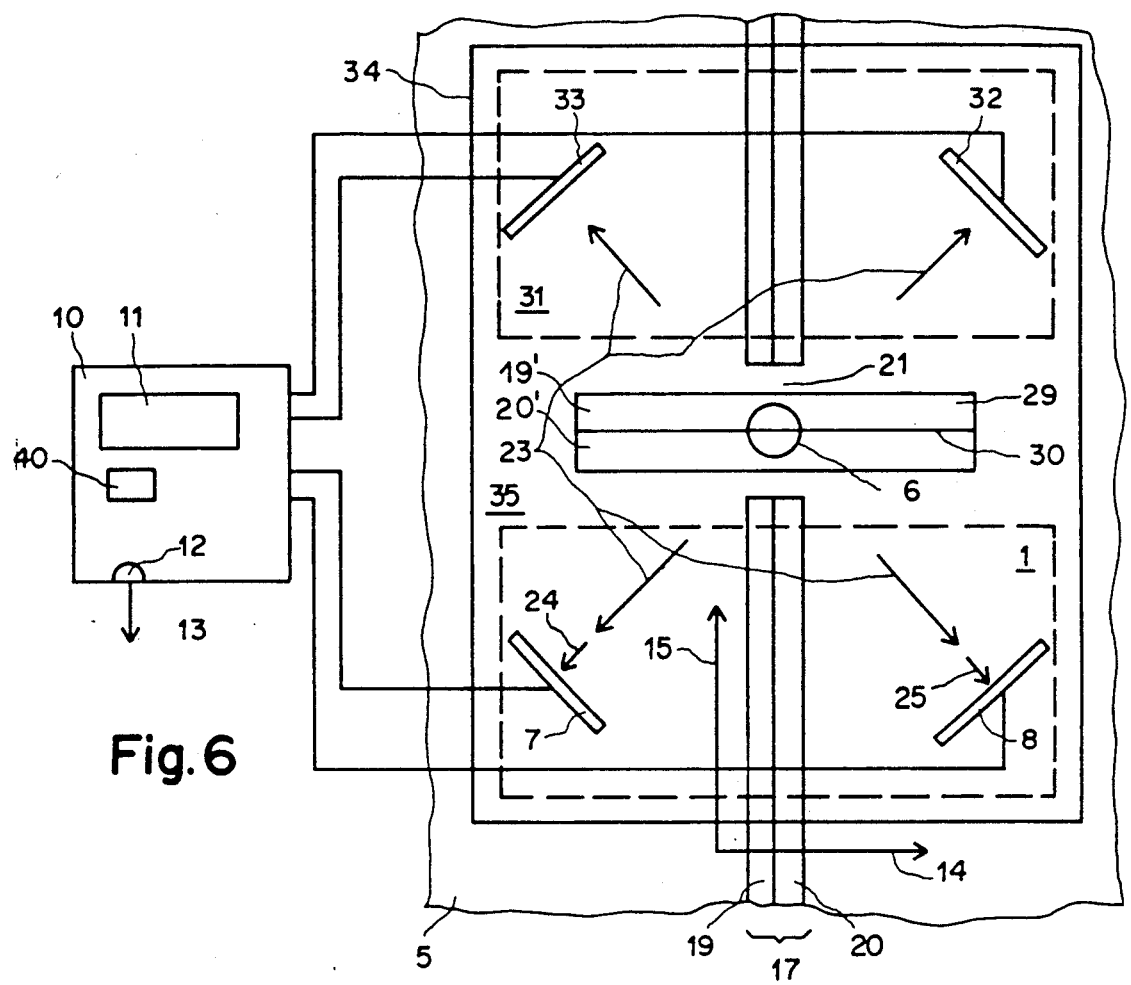
FIG. 6 is a plan view of a measuring arrangement according to an embodiment of the invention, including the tracking sensor of FIGS. 1 to 3 and a mark sensor.

If the full accuracy of the measuring arrangement is to be utilized for signalling the beginning of a fresh period of the patterns 16, then additional markings 29, as shown in FIG. 6, are advantageously embossed simultaneously with the marking track 17 on the web 5 of foil at the predetermined locations. Each of those markings 29 comprises two adjacent diffraction grating tracks 19' and 20' which differ in diffraction-optical terms, a common boundary 30 of the two diffraction grating tracks 19' and 20' being disposed normal to the marking track 17. The two diffraction grating of the marking 29 advantageously differ from the diffraction gratings of the marking track 17, for examle, only in regard to the grating frequency.

The markings 29 are preferably arranged at spacings beside the marking track 17 or in the intermediate spaces 21, while the web 5 of foil does not have any further embossings in a track of the markings 29. So that as little space as possible is wasted in the web 5 of foil for the additional markings 29, they are advantageously embossed in the intermediate spaces 21 in the marking track 17. The marking 29 is for example 10 mm in length in the lateral direction 14 and is 3.6 mm in width in the web direction 15, that is to say, the two diffraction grating tracks 19' and 20' are each of an area of 10 mm by 1.8 mm.

In addition to the sensor 1, the re-winding installation also has a second tracking sensor which is identical except for the directions of incidence as indicated at 24 and 25, namely a mark sensor 31, for sensing the markings 29; the detectors 32 and 33 of the receiver of the mark sensor 31 are responsive to the properties of the two diffraction grating of the markings 29.

In FIG. 6, the spot 6 is disposed precisely on the boundary 30. In an advantageous embodiment, the detectors 7 and 8 of the tracking sensor 1 and the detectors 32 and 33 of the mark sensor 31 are arranged in plan view symmetrically with respect to the boundary 30 and around the spot 6. A single beam 22 (FIG. 1), which is formed from the light 4 of a single light source 6 by means of the optical means 3, successively illuminates the sections of the marking track 17 and the markings 29 in the spot 6 when the web 5 of foil is unwound and rewound. The diffraction gratings of the marking track 17 diffract the light at the diffraction angle $\alpha$ and the diffraction gratings of the markings 29 diffract the light through the diffraction angle $\beta$, wherein the light 23 which is diffracted at the diffraction angle $\alpha$, by virtue of the presence of the collimators, cannot fall on the detectors 32 and 33 and the light 23 which is diffracted at the diffraction angle $\beta$ cannot fall on the detectors 7 and 8.

A common sensor housing 34 encloses, for example, the tracking sensor 1, the mark sensor 31 and the single beam 22 with the means 2 and 3 for producing same, and thus forms a combination sensor 35.

Dividing up the arrangement into the reading head and the transducer portion, which are both connected by means of optical fiber light guides, is also advantageous is relation to the combination sensor; in that configuration, corresponding to the four detectors 7, 8, 32 and 33, four light guides are to be arranged around the light guide for lighting the spot 6.

The spot 6 may, for example, be in the form of a square with a side length of 3.6 mm, the sides thereof being aligned with the marking track 17 and the markings 29.

Figure 7:
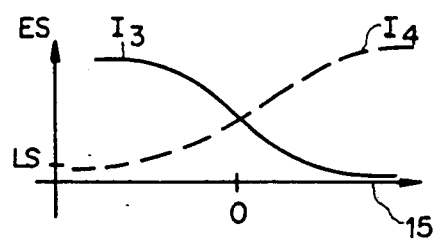
FIG. 7 shows sensed signals from the mark sensor as a function of a direction of the web.
Figure 8:
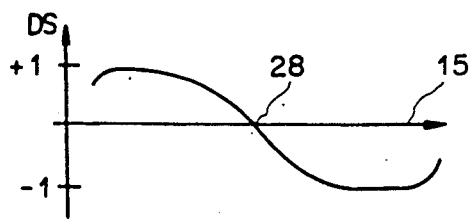
FIG. 8 shows a difference signal formed from the signals in FIG. 7, as a function of the direction of the web.

The mark sensor 31 is also connected to the measuring apparatus 10 and transmits thereto sensed signals ES from the detectors 32 and 33, as shown in FIG. 7. The computing unit 11 computes a difference signal DS (FIG. 8) from the intensities $I_3$ and $I_4$ of the sensed signals ES, in similar manner to formula 1. In the re-winding operation, the spot 6 moves in the web direction 15 towards the marking 29 and, as soon as the spot 6 illuminates one of the diffraction grating tracks 19', 20' of the marking 29 and the sum of the intensities $I_3$ and $I_4$ of the sensed signals ES exceeds a level LS which can be adjusted in a predetermined fashion, the difference signal DS is of, for example, a positive value. The measuring apparatus 10 outputs a synchronization signal when the spot 6 illuminates precisely equal portions of the two diffraction grating of the marking 29 or when the computing unit 11 detects the transition 28 through zero of the difference signal DS.

The computing unit 11 also produces the corresponding auxiliary signals for the mark sensor 31, as for the tracking sensor 1, and also displays them on the display panel of the measuring apparatus 10, as an aid to setting up the assembly.

A position of the marking 29 which is determined by the transition 28 through zero of the difference signal DS is also displaceable in the web direction 15 by varying the gain factor for the sensed signals ES in the measuring apparatus 10 and permits the re-winding installation to be accurately set up in the web direction 15.

The position of the marking track 17 or the position of the marking 29 on the web 5 of foil is ascertained by means of the transition 28 through zero, accurately to within a few micrometers. If the web 5 of foil is, for example, in the form of a hot embossing foil with patterns 16, that measuring arrangement makes it possible accurately to determine the position of each pattern 16 and thus permits the patterns 16 to be transferred with a high degree of precision to a predetermined location on a carrier (not shown herein).

Figure 9:
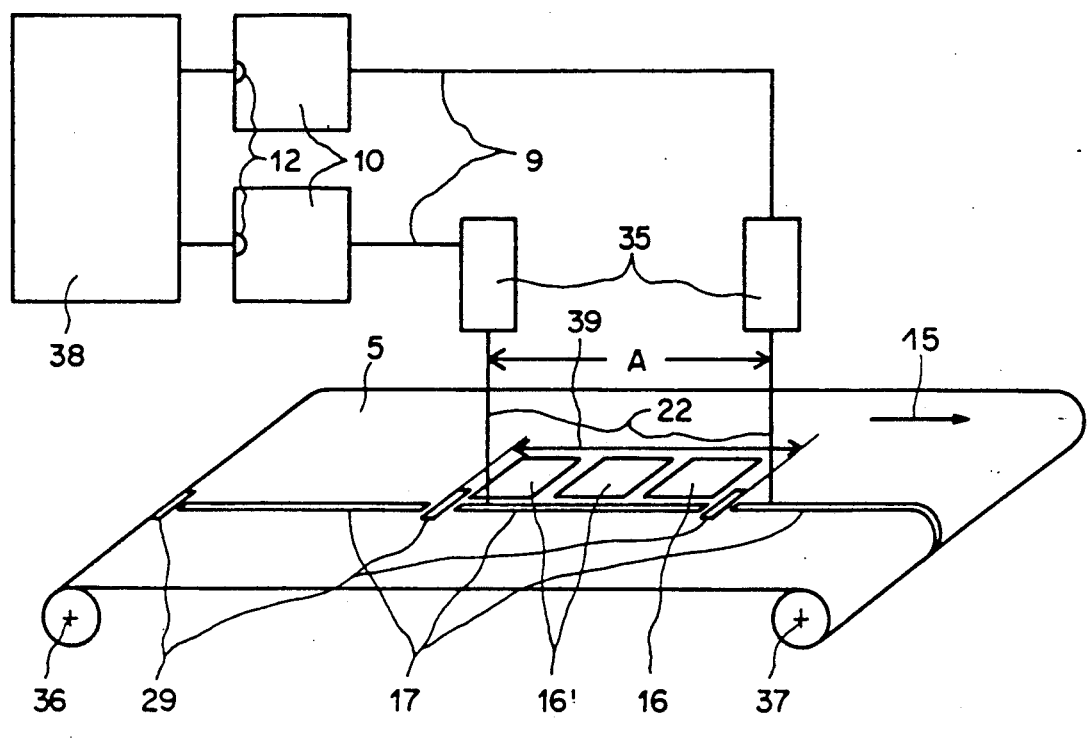
FIG. 9 shows a re-winding installation with two combination sensors.

A re-winding installation advantageously has two combination sensors 35, as shown in FIG. 9. The web 5 of foil is unwound from a delivery roll 36 and wound again on to a receiving roll 37 in the web direction 15 and is pulled through in a stretched condition beneath the combination sensors 35. The beams 22 of the combination sensors 35 are arranged at a predetermined spacing A and successively sense the same sectors of the marking track 17 and the same markings 29. Each combination sensor 35 is connected by way of lines 9 to its measuring apparatus 10, the output 12 of which is connected to an evaluation apparatus 38 of the control assembly of the re-winding installation.

From the spacing A and the time difference between the two synchronization signals which the evaluation apparatus 38 receives from the measuring apparatuses 10, the evaluation apparatus 38 calculates a respective precise actual value in respect of a distance 39 between two successive equidistant markings 29. That actual value is compared to a stored predetermined reference value. On the basis of the result of that comparison, the evaluation apparatus 38 varies, in the control arrangement of the re-winding installation, the effect of an unwinding brake (not shown herein) which acts on the delivery roll 36, in which case the tension in the web 5 of foil in the re-winding operation is altered in such a way that the distance 39 precisely corresponds to the reference value, because of the variable stretching of the foil. That arrangement is advantageous when there are a plurality of patterns 16, 16' between the markings 29 and the subsequent patterns 16' must be located with the same degree of accuracy as the pattern 16 which is disposed immediately adjacent the marking 29.

The measuring apparatus 10 (see FIG. 6) advantageously has at least one counter 40 which counts off events derived from the sensed signals E or ES respectively, while the counter condition can be read off on the display panel of the measuring apparatus 10. The counter 40 ascertains, for example from the additional signals, the number of intermediate spaces 21 detected by the tracking sensor 1, or it ascertains from the synchronization signals the number of markings 29 which are registered by the mark sensor 31. The counter condition is proportional in both examples to the number of patterns 16.

In the re-winding procedure, the measuring apparatus 10 which is connected to a combination sensor 35 outputs the auxiliary signals, the correction signal 13, the counter condition and the synchronizing signal by way of the output 12. The evaluation apparatus 38 (FIG. 9) evaluates all those signals. For example, the counter condition is continuously compared to a number which is set in a predetermined fashion and which is stored in the evaluation apparatus 38, and, when it is below a predetermined value, the difference is interpreted as a braking signal for a drive for the rollers 36 and 37 in order to stop the web 5 of foil at the synchronizing signal so that the beam 22 then remains on a predetermined marking 29.

In an advantageous development of the counter 40 (FIG. 6), a unit is added to the stored counter condition when the synchronization signal is produced, on the transition 28 through zero from positive to negative values of the difference signal DS. On the other hand, the counter condition is reduced by a unit when the transition 28 through zero is from negative to positive values, as is the case when the re-winding installation is run backwards, as for example when setting up the assembly.

The computing unit 11 (FIG. 6) advantageously determines the speed of the web 5 of foil from the variation in respect of time in the counter condition, when the intermediate spaces 21 or the markings 29 occur in succession at equal spacings on the web 5 of foil, and the predetermined value in respect of the distance 39 is stored in the measuring apparatus 10. In that way, the measuring arrangement can additionally be used as a tachometer of the re-winding installation. If the measuring arrangement includes at least one mark sensor 31, then the web direction 15 can also be determined simultaneously with the speed.

Figure 10:
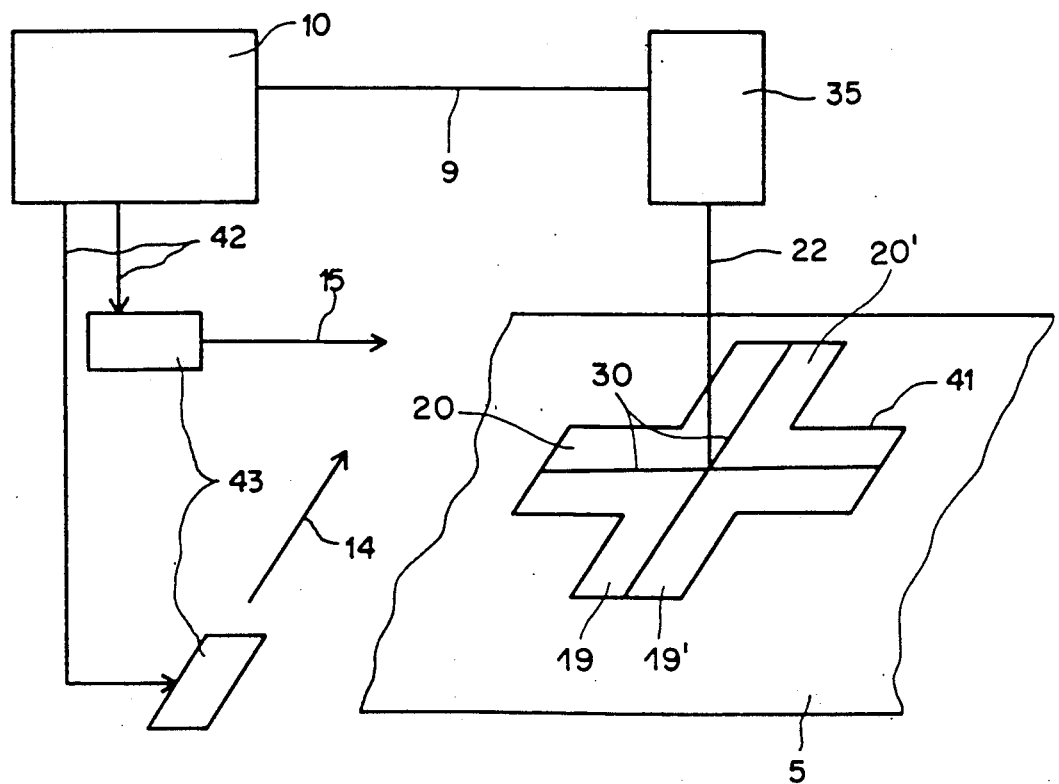
FIG. 10 shows a positioning device.

The combination sensor 35 (FIGS. 5, 8 and 10) can also be used as a positioning means for finding a target mark 41. The combination sensor 35 is connected by means of the line 9 to the measuring apparatus 10 which determines direction signals 42 from the difference signals D and DS, and transmits the direction signals to two drives 43. The drives 43 produce a relative movement in the lateral direction 14 and in the web direction 15 between the combination sensor 35 and the web 5 of foil or generally a flat surface and position the beam 22 on the target mark 41. The drives 43 act on the rolls of the re-winding installation or move the combination sensor 35 in parallel relationship over the web 5 of foil. The measuring apparatus 10 moves the spot 6 over the web 5 of foil along a predetermined search path until the combination sensor 35 receives diffracted light 23 from the target mark 41. The beam 22 is then centered on the center point of the target mark 41 by means of the drives 43.

The target mark 41 is made up, for example, of at least one marking 29 (see FIG. 6) and at least one section of the marking track 17, which are embossed in cross form on the web 5 of foil.

The diffraction grating tracks 19, 19', 20 and 20' (FIG. 10) are, for example, embossed in such a way that the common boundaries 30 form a cross and symmetrically divide the target mark 41. The target mark 41 may equally advantageously instead be a circular surface with four sectors of equal size, which differ in terms of the diffraction grating.

Instead of the target mark 41 being embossed directly into the sheet-like surface or web 5 of foil, it may be possible to utilize stuck-on labels which carry the target marks 41.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. An arrangement for measuring the deviation of a marking track of a web of foil from a central position, the arrangement comprising:
    a tracking sensor including a light source and an optical receiver arranged on the same side of the web, said light source having an optical means for illuminating said marking track with a spot of predetermined size, said optical receiver having two photosensitive detectors for producing respective sensed signals in response to light received from the illuminated spot, and wherein said tracking sensor and said web of foil are movable relative to each other; and
    a measuring apparatus connected to said photosensitive detectors and including a computing unit for converting said sensed signals from said photosensitive detectors into a difference signal indicative of the deviation of the marking track;
    wherein said marking track comprises two mutually parallel diffraction grating tracks differing in diffraction-optical characteristics, and wherein each of said photosensitive detectors is arranged so as to receive light diffracted at a predetermined order of diffraction from a respective one of said two diffraction grating tracks when said illuminated spot is coincident with the respective diffraction grating track.

2. An arrangement as set forth in claim 1, wherein said measuring apparatus for said sensed signals from said photosensitive detectors includes two separate amplifiers and at least one of said amplifiers has an adjustable gain factor for determining a central position of the web of foil.

3. An arrangement as set forth in claim 2, wherein said light source or said optical means is operable to modulate the light, and said amplifiers of said measuring apparatus provide selective amplification of a modulation signal in said sensed signals.

4. An arrangement as set forth in claim 1, wherein said computing unit is connected to a storage means and is operable to produce correction signals when said difference signal exceeds an upper limit value or when said difference signal falls below a lower limit value, said upper and lower limit values being provided by said storage means.

5. An arrangement as set forth in claim 1, wherein the direction of incidence of the diffracted light from each of the diffraction grating tracks has a respective azimuth angle of 135° and 225° and a diffraction angle from the range of from 30° to 60°.

6. An arrangement as set forth in claim 1, wherein the light from said light source is monochromatic light.

7. An arrangement as set forth in claim 1, wherein said computing unit is operable to form said difference signal D from the quotient:

$$D = \frac{I_2 - I_1}{I_2 + I_1}$$

wherein $I_1$ represents the intensity of the sensed signal from one of said detectors and $I_2$ represents the intensity of the sensed signal from the other of said detectors.

8. An arrangement as set forth in claim 1, wherein at least one optical marking which has two adjacent diffraction gratings differing in diffraction-optical characteristics is arranged on the web of foil such that the common boundary of the two diffraction gratings is normal to the marking track, the arrangement including a mark sensor which comprises a further optical receiver with two further photosensitive detectors which are so arranged that each of said further photosensitive detectors receives light which is diffracted at said illuminated spot at a predetermined order of diffraction from a respective one of said two diffraction gratings, said two further photosensitive detectors being connected to said measuring apparatus, and said computing unit being operable to convert the sensed signals produced by said two further photosensitive detectors into a second difference signal and to provide a synchronizing signal at a transition through zero of said second difference signal.

9. An arrangement as set forth in claim 8, wherein said tracking sensor and said mark sensor are installed in a common sensor housing of a combination sensor, and a single light source and a single optical means are common to the two sensors of said combination sensor.

10. An arrangement as set forth in claim 9, wherein said marking track and said optical marking jointly form a target mark, and movement of said web of foil relative to said combination sensor is controllable by direction signals which are produced by said measuring apparatus from said first-mentioned and second difference signals in such a way that the beam of said combination sensor is automatically positioned at the middle of the target mark.

11. An arrangement as set forth in claim 8, wherein said measuring apparatus includes means for producing auxiliary signals when the sum of said sensed signals from said photosensitive detectors falls below a predetermined level.

12. An arrangement as set forth in claim 8, wherein said measuring apparatus includes a counter for counting off events which are derived from said sensed signals in said measuring apparatus and which are proportional to the number of said markings or intermediate spaces between said markings.

* * * * *